(12) United States Patent
Taniguchi et al.

(10) Patent No.: US 9,973,289 B2
(45) Date of Patent: May 15, 2018

(54) SIGNAL LINE NOISE RESISTANCE EVALUATING METHOD AND ITS DEVICE

(71) Applicant: HITACHI, LTD., Tokyo (JP)

(72) Inventors: Hitoshi Taniguchi, Tokyo (JP); Hiroki Funato, Tokyo (JP); Isao Hoda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days. days.

(21) Appl. No.: 15/461,859

(22) Filed: Mar. 17, 2017

(65) Prior Publication Data
US 2018/0076911 A1 Mar. 15, 2018

(30) Foreign Application Priority Data

Sep. 12, 2016 (JP) .................................. 2016-177742

(51) Int. Cl.
H04B 17/00 (2015.01)
H04B 17/345 (2015.01)

(52) U.S. Cl.
CPC .................................. *H04B 17/345* (2015.01)

(58) Field of Classification Search
CPC ...... H04B 1/0475; H04B 1/10; H04B 1/1027; H04B 15/00; H04B 15/005; H04B 15/02; H04B 17/345; H04B 2215/061
See application file for complete search history.

(56) References Cited

U.S. PATENT DOCUMENTS 4,879,507 A * 11/1989 Smith .................... G01R 29/26
324/207.17
9,645,871 B2 * 5/2017 Shimbo ............... G06F 17/5045
(Continued)

FOREIGN PATENT DOCUMENTS

JP 2005-311383 A 11/2005
JP 2011-257898 A 12/2011
(Continued)

OTHER PUBLICATIONS

S.A. Pignari et al., Plane-Wave Coupling to a Twisted-Wire Pair Above Ground, IEEE Transactions on Electromagnetic Compatibility, vol. 53, No. 2, May 2011, pp. 508-523.
(Continued)

Primary Examiner — Siu Lee
(74) Attorney, Agent, or Firm — Baker Botts L.L.P.

(57) ABSTRACT

The present disclosure generally relates to a signal transmission path evaluation device and method for evaluating EMC resistance of a signal transmission path using a computer system. An operating device of the computer system is input with signal transmission line shape data, signal transmission line path data, signal transmission line shape dispersion data, and margin information for noise input of a communication device connected to the signal transmission line. Calculations are performed including an electric field or a magnetic field in a vicinity of the signal transmission line path from the signal transmission line path data, dispersion of the signal line transmission line shape via a random number, noise waveform at a communication device input from the electric field or the magnetic field in the vicinity of the signal transmission path, error occurrence determination, and error rate from plural time trial results. Information concerning the calculated error rate is output.

15 Claims, 9 Drawing Sheets

(56) References Cited

U.S. PATENT DOCUMENTS

2013/0132056 A1   5/2013   Toba et al.
2015/0346254 A1   12/2015   Nara

FOREIGN PATENT DOCUMENTS

JP   2012-037321 A   2/2012
JP   2015-224995 A   12/2015

OTHER PUBLICATIONS

K. Gotoh et al., APD Measurement for Evaluating Disturbances Related to the Performance of Digital Communication Systems, Ieice Transactions on Communications, vol. E88-B, No. 8, Aug. 2005, pp. 3235-3241.

* cited by examiner

SIGNAL LINE NOISE RESISTANCE EVALUATING METHOD AND ITS DEVICE

CLAIM OF PRIORITY

The present application claims priority from Japanese application serial no. JP 2016-177742, filed on Sep. 12, 2016, the content of which is hereby incorporated by reference into this application.

BACKGROUND OF THE INVENTION

The present invention relates to a signal line noise resistance evaluating method and its device of an electronic device.

As a background art of the present field of the invention, there is Japanese Unexamined Patent Application Publication No. 2005-311383. The publication describes to include a step of extracting impedance information of a power source wiring of inside and outside of a semiconductor integrated circuit, the equivalent circuit forming step described above, and an analyzing step of supplying a noise waveform from outside, and analyzing influence of noise to the semiconductor integrated circuit.

Further, Japanese Unexamined Patent Application Publication No. 2011-257898 describes a simulation device including a discrete event simulation unit of carrying out a discrete type simulation of a constituent element of a defined configuration model based on a connecting information indicating a connection relationship between attribute information which is a part information of a constituent element of the defined configuration model and a constituent element of a defined configuration model, and a software error rate calculation processing unit of calculating a software error rate of the defined configuration model based on a simulation result of the discrete event simulation section and software error rate data of the attribute information.

Further, Japanese Unexamined Patent Application Publication No. 2012-37321 describes that time sequence data is converted to time frequency domain data of electric/magnetic field to display by a finite impulse response operation based on time sequence data of electric/magnetic field by electromagnetic field simulation, a parameter in complex wevelet base operation, and wevelet base function.

Further, Japanese Unexamined Patent Application Publication No. 2015-224995 describes to include an S parameter measuring unit, an evaluation index calculating unit, a product frequency spectrum calculating unit of calculating a product frequency spectrum by a product of an FFT frequency spectrum by an evaluation index by acquiring an FFT frequency spectrum of a voltage waveform when noise is inputted, and a frequency extracting unit of extracting a frequency of evaluating noise resistance from a peak of a voltage.

SUMMARY OF THE INVENTION

A railroad car, a hybrid automobile or the like is mounted with an electronic device which is connected to a large power inverter by a network. In these devices, inverter noise or the like is mixed to a network wiring between the electronic devices connected by the network to cause an erroneous operation of the electronic devices.

In order to reduce design steps while ensuring reliability of the network among the electronic devices, it is necessary to reduce a design feedback by a design stage simulation evaluation. Further, it is difficult to fix a signal line wiring, and therefore, it is indispensable to predict an erroneous operation in consideration of path dispersion.

On the other hand, Japanese Unexamined Patent Application Publication No. 2005-311383 describes a technology including a step of extracting impedance information of a power source wiring inside and outside a semiconductor integrated circuit, the equivalent circuit forming step, and an analyzing step of analyzing influence of noise on the semiconductor integrated circuit by supplying a noise waveform from outside. However, the prior art indicates a method of analyzing power source noise by forming an equivalent circuit of a power source circuit and giving an outside noise waveform in a semiconductor integrated circuit and a printed circuit board, and cannot be applied for analyzing influence of electromagnetic noise applied to a signal wiring or path dispersion thereof, or evaluating noise resistance.

Further, Japanese Unexamined Patent Application Publication No. 2011-257898 describes a technology including a simulation device including a discrete event simulation unit for carrying out a discrete type simulation of a constituent element of the defined configuration model based on part information and connection information, and a software error rate calculation processing unit of calculating a software error rate of the defined configuration model based on a simulation result of the discrete event simulation unit and software error rate data in the attribute information. However, the prior art shows a method of analyzing a software error rate brought about mainly at a memory circuit by outside noise caused by an environmental neutron beam in a semiconductor integrated circuit and a printed circuit board, and cannot be applied for analyzing influence or evaluating noise resistance of electromagnetic noise applied on a signal wiring or path dispersion.

Further, Japanese Unexamined Patent Application Publication No. 2012-37321 shows a method of converting and displaying time frequency domain data of an electric field or a magnetic field from time sequence data of an electric field or a magnetic field by an electromagnetic simulation. However, the prior art shows a method of converting and analyzing time frequency domain data of an electric field or a magnetic field of the electric field of the magnetic field simulation, and cannot be applied for analyzing influence and evaluating noise resistance of noise applied on a signal wiring or path dispersion thereof.

Similarly, Japanese Unexamined Patent Application Publication No. 2015-224995 shows a method of extracting a frequency for evaluating noise resistance by measuring the S parameter or evaluating noise resistance from the FFT frequency spectrum of a voltage waveform when noise is inputted. However, the prior art shows a method of extracting a frequency which becomes a noise resistance evaluating object, and cannot be applied for analyzing influence or evaluating noise resistance of noise applied on a signal wiring or path dispersion thereof.

Hence, the present invention provides a signal line noise resistance evaluating method and its device for calculating an error rate in consideration signal line dispersion from error domain information for a signal line shape and/or signal line shape dispersion and/or signal line noise.

In order to resolve the above-described problem, according to the present invention, there is provided a method of evaluating noise resistance of a signal transmission line for connecting electronic control devices by using a computer system, information concerning a shape of the signal transmission line, information concerning a path of the signal transmission line, object information other than the signal transmission line, information concerning shape dispersion of the signal transmission line, and information including noise margin information of the electronic control device connected to the signal transmission line are inputted from an inputting unit of the computer system, wherein an electric field and a magnetic field at a vicinity of the transmission line are calculated by using the information concerning the inputted signal transmission path shape, the information concerning the signal transmission line path, and the information of an object other than the signal transmission line by the computer system, a waveform of noise generated at the signal transmission line is calculated by using information of the calculated electric field and the calculated magnetic field at the vicinity of the signal transmission line, the information concerning the inputted signal transmission line shape, the information concerning the signal transmission line path and the information concerning the shape deviation of the signal transmission line by the computer system, and an error rate of the electronic control device is calculated by using waveform information of the noise generated at the calculated signal transmission line and the inputted noise margin information of the electronic control device by the computer system.

Further, in order to resolve the above-described problem, according to the present invention, there is provided a signal line noise resistance evaluating device for evaluating noise resistance of a signal transmission line connecting electronic control devices, the signal line noise resistance evaluating device including an inputting unit for inputting information concerning a shape of the signal transmission line, information concerning a path of the signal transmission line, object information other than the signal transmission line, information concerning shape dispersion of the signal transmission line, information including noise margin information of an electronic control of an electronic control device connected to the signal transmission line, and a storing unit for storing information concerning a shape of the signal transmission line, information concerning a path of the signal transmission line, object information other than the signal transmission line, information concerning shape dispersion of the signal transmission line, and noise margin information of the electronic control device connected to the signal transmission line, all of which are inputted to the inputting section, a signal transmission path vicinity electric field magnetic field calculating unit for calculating an electric field and a magnetic field at a vicinity of the signal transmission line by using information concerning a shape of the signal transmission line, information concerning a path of the signal transmission line, object information other than the signal line transmission line, all of which are stored to the storing unit, a noise waveform calculating unit for calculating a waveform of noise generated at the signal transmission line by using information of the electric field and the magnetic field at the vicinity of the signal transmission line calculated by the signal transmission path vicinity electric field magnetic field calculating unit, information concerning the signal transmission path shape stored to the storing unit, information concerning a signal transmission path shape stored to the storing unit and information concerning the shape of the signal transmission line stored to the storing unit, and an error rate calculating unit for calculating an error rate of the electronic control device by using waveform information of the noise generated at the signal transmission line calculated by the noise waveform calculating unit and the inputted piece of noise margin information by the noise waveform calculating unit.

According to the present invention, in the signal line noise resistance evaluating method and its device, an error rate in consideration of signal line dispersion can be calculated. A problem, a configuration, and an effect other than the above-described will be apparent by the following description of embodiments.

DESCRIPTION OF THE PREFERRED EMBODIMENTS

The present invention relates to a signal transmission path evaluation assisting method and its device for evaluating EMC (Electro-Magnetic Compatibility) resistance of a signal transmission path by using a computer system, in which an operating device of the computer system is inputted with shape data of a signal transmission line, signal transmission line path data, signal transmission line shape dispersion data, and margin information for a noise input of a communication device connected to the signal transmission line, an electric field or a magnetic field at a vicinity of the signal transmission line path is calculated from the signal transmission line path data or the like, dispersion of the signal line transmission line shape is calculated by a random number, a noise waveform at a communication device input is calculated from the electric field or the magnetic field at the vicinity of the signal transmission path, error occurrence determination is carried out by comparing a margin for a noise input of the communication device connected to the signal transmission line and a noise waveform, an error rate is calculated from plural times trial results, and information concerning the calculated error rate is outputted.

In all of the drawings for explaining the present embodiment, an element having the same function is attached with the same notation, and repeated explanation thereof will be omitted as a rule. In the following, a detailed explanation will be given of the embodiments of the present invention in reference to the drawings.

However, the present invention is not to be interpreted as being limited to description contents of the embodiments shown below. Skilled persons can easily understand that the specific configuration can be changed within a range not deviated from the thought or the gist of the present invention.

First Embodiment

Figure 2:
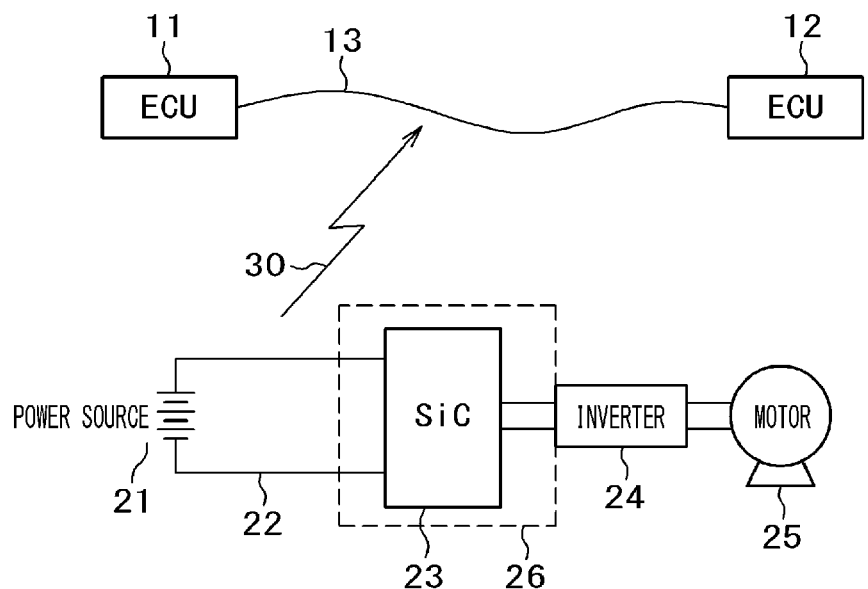
FIG. 2 is a block diagram showing an outline configuration of an evaluation object evaluated by the signal line noise resistance evaluating device according to first embodiment of the present invention.

FIG. 2 shows an example of a configuration of a circuit configuring an object of an evaluation according to the present embodiment. The configuration shown in FIG. 2 schematically shows a configuration of arranging a circuit for controlling to drive a drive apparatus 25 of a motor or the like at a vicinity of a CAN (Controller Area Network) wiring 13 for connecting two ECUs (Electrical Control Unit) 11 and 12.

The drive apparatus 25 of a motor or the like is driven by being connected to a power source 21. A power device 23 of SiC (Silicon Carbide) or the like connected by a wiring 22 from the power source 21 and an inverter 24 for controlling to drive the drive apparatus 25 based on an output from the power device 23 are disposed between the drive apparatus 25 and the power source 21.

In such a configuration, the power device 23 is switched at a high speed, and therefore, electromagnetic noise at a high frequency is generated from the wiring 22 connecting the power device 23 and the power source 21. The electromagnetic noise generated from the power device can be prevented from effecting influence on surrounding by covering the surrounding of the power device 23 with an electromagnetic shield 26.

However, it is difficult to completely shield electromagnetic noise 30 generated from a portion of the wiring 22 which cannot be covered by the electromagnetic shield 26, and a portion thereof is applied to the CAN wiring 13. The noise signal applied on the CAN wiring 13 is superposed on a signal for controlling ECU 11 or 12, and there is a concern of erroneously operating ECU 11 or 12.

The present invention relates to an apparatus of evaluating noise resistance of the CAN wiring 13 for connecting electronic control devices of ECU 11, 12 or the like and an evaluating method thereof. According to the present embodiment, a description will be given of a case of a communication device as an electronic control device connected to the signal transmission line (CAN wiring 13).

Figure 1:
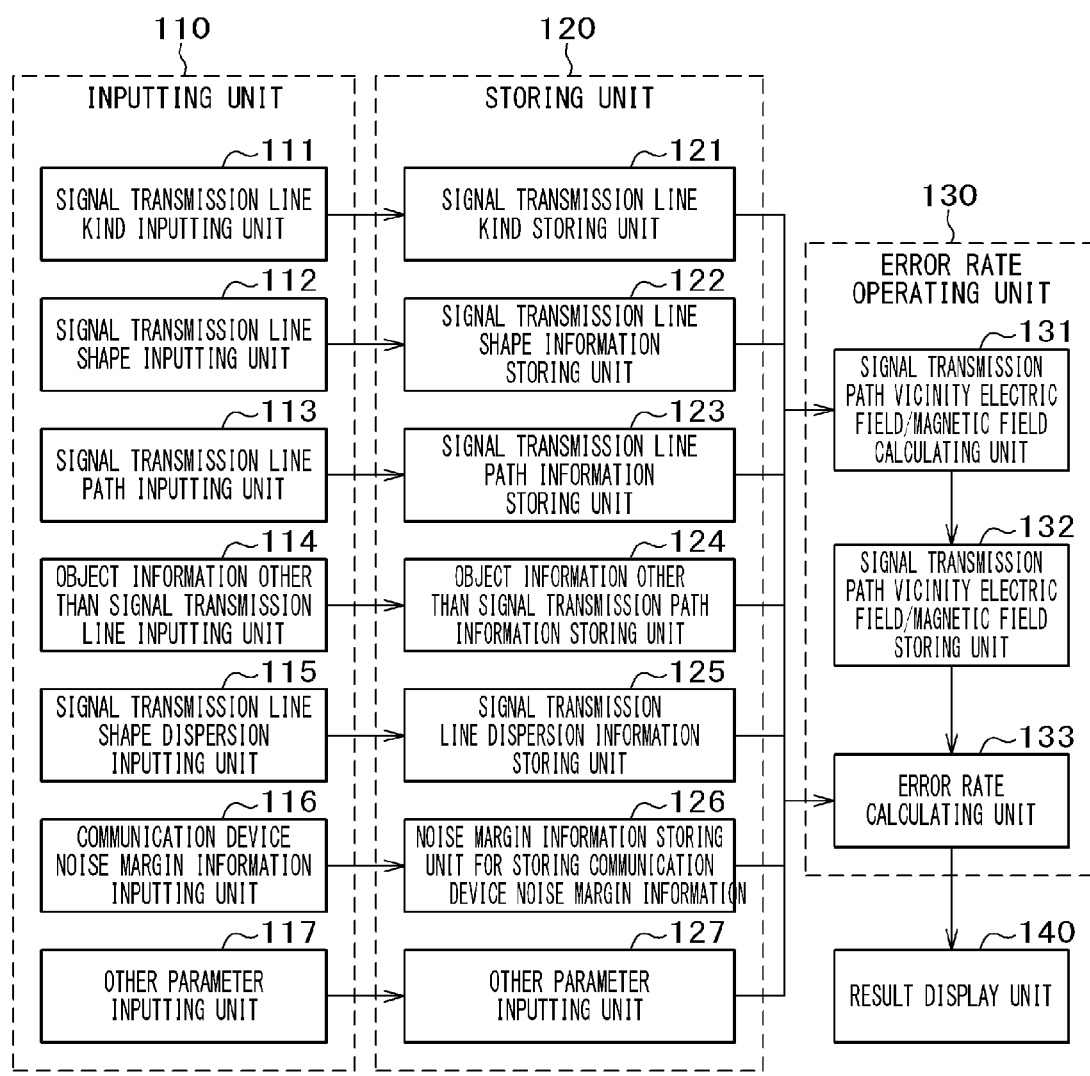
FIG. 1 is a block diagram showing an outline configuration of a signal line noise resistance evaluating device according to first embodiment of the present invention.

FIG. 1 shows a block diagram showing an outline configuration of a signal line noise resistance evaluating device 100 according to first embodiment of the present invention.

The signal line noise resistance evaluating device 100 according to the present embodiment is configured by including an inputting unit 110, a storing unit 120, an error rate operating unit 130, and a result display unit 140.

The inputting unit 110 includes a signal transmission line kind inputting unit 111 for inputting a kind of a signal transmission line, a shape inputting unit 112 for inputting a shape of a signal transmission line, a path inputting unit 113 for inputting a path of the signal transmission line, an object information inputting unit 114 for inputting object information other than the signal transmission line, a shape dispersion inputting unit 115 for inputting shape dispersion of the signal transmission line, a noise margin information inputting unit 116 for inputting noise margin information of a communication device which is an electronic control device connected to the signal transmission line, and a parameter inputting unit 117 for inputting other parameters.

The storing unit 120 includes a signal line kind storing unit 121 for storing information of a kind of a signal transmission line inputted from the signal transmission line kind inputting unit 111, a signal transmission line shape information storing unit 122 for storing shape information of a signal transmission line inputted from the shape inputting unit 112, a signal transmission line path information storing unit 123 for storing shape information of a signal transmission line inputted from the path inputting unit 113, an object information storing unit 124 for storing object information other than a signal transmission line inputted from the object information inputting unit 114, a signal transmission line dispersion information storing unit 125 for storing shape dispersion information of a signal transmission line inputted from the path shape dispersion inputting unit 115, a noise margin information storing unit 126 for storing communication device noise margin information connected to a signal transmission line inputted from the noise margin information inputting unit 116, and a parameter information storing unit 127 for storing other parameter information inputted from the parameter inputting unit 117.

The error rate operating unit 130 includes a signal transmission line vicinity electric field/magnetic field calculating unit 131 for calculating a signal transmission line vicinity electric field/magnetic field by using signal transmission line kind information, the signal transmission path shape information, signal transmission line path information and the object information other than the signal transmission line inputted from the inputting unit 110 and stored to the storing unit 120, the signal transmission line vicinity electric field/magnetic field storing unit 132 for storing calculation results of the signal transmission line vicinity electric field/magnetic field calculated by the signal transmission line vicinity electric field/magnetic field calculating unit 131, and an error rate calculating unit 133 for calculating an error rate from information of the signal transmission path vicinity electric field, magnetic field stored to the signal transmission line vicinity electric/magnetic field storing unit 132 and information of the noise margin of a communication device connected to the signal transmission line stored to the a signal transmission line dispersion information storing unit 125.

A result display unit 140 displays the error rate calculated by the error rate calculating unit 133 on a screen.

A description will be given of a method of evaluating noise resistance of a signal line of an evaluation object by using the signal line noise resistance evaluating device 100 having such a configuration in reference to a flowchart shown in FIG. 3.

According to a method of evaluating noise resistance of a signal line of an evaluation object by using the signal line noise resistance evaluating device 100 according to the present embodiment, first, at a calculating condition inputting step S300, data configuring conditions of calculation are inputted from the signal transmission line kind inputting unit 111, the shape inputting unit 112, the path inputting unit 113, the shape dispersion inputting unit 115, and the noise margin information inputting unit 116 of the inputting unit 110. Next, at a signal transmission path vicinity electric field/magnetic field calculating step S301, the electric field and or the magnetic field at the vicinity of the signal transmission path are/is calculated by using shape information of the signal transmission line stored to the signal transmission path shape information storing unit 122 of the storing unit 120, and the path information of the signal transmission line stored to a signal transmission line path information storing unit 123. Next, it is determined whether the calculation is finished at a calculation finish determining step S302.

When it is determined that the calculation is not finished (No) at the calculation finish determining step S302, a signal transmission path shape is calculated at a noise waveform calculating step S303 from the shape dispersion information of the signal transmission line stored to the signal transmission line dispersion information storing unit 125 and a random number, and a noise waveform at the communication device input is calculated from the signal transmission path vicinity electric field/magnetic field calculated at step S301. Next, at an error occurrence determining step S304, an error occurrence is determined by comparing a noise margin of a communication device connected to the signal transmission line stored to the communication device noise margin information storing unit 126 and a noise waveform calculated at the noise waveform calculating step S303.

Steps S303 and S304 are repeatedly executed, and in a case where it is determined that the calculation is finished (Yes) at the calculation finish determining step S302, at the error rate calculating step S305, an error rate is calculated from an error determined by the error occurrence determining step S304 at the error rate calculating step S305, and a calculated result is displayed at the result display step S306.

Next, a description will be given of details of the flowchart shown in FIG. 3.

Figure 4:
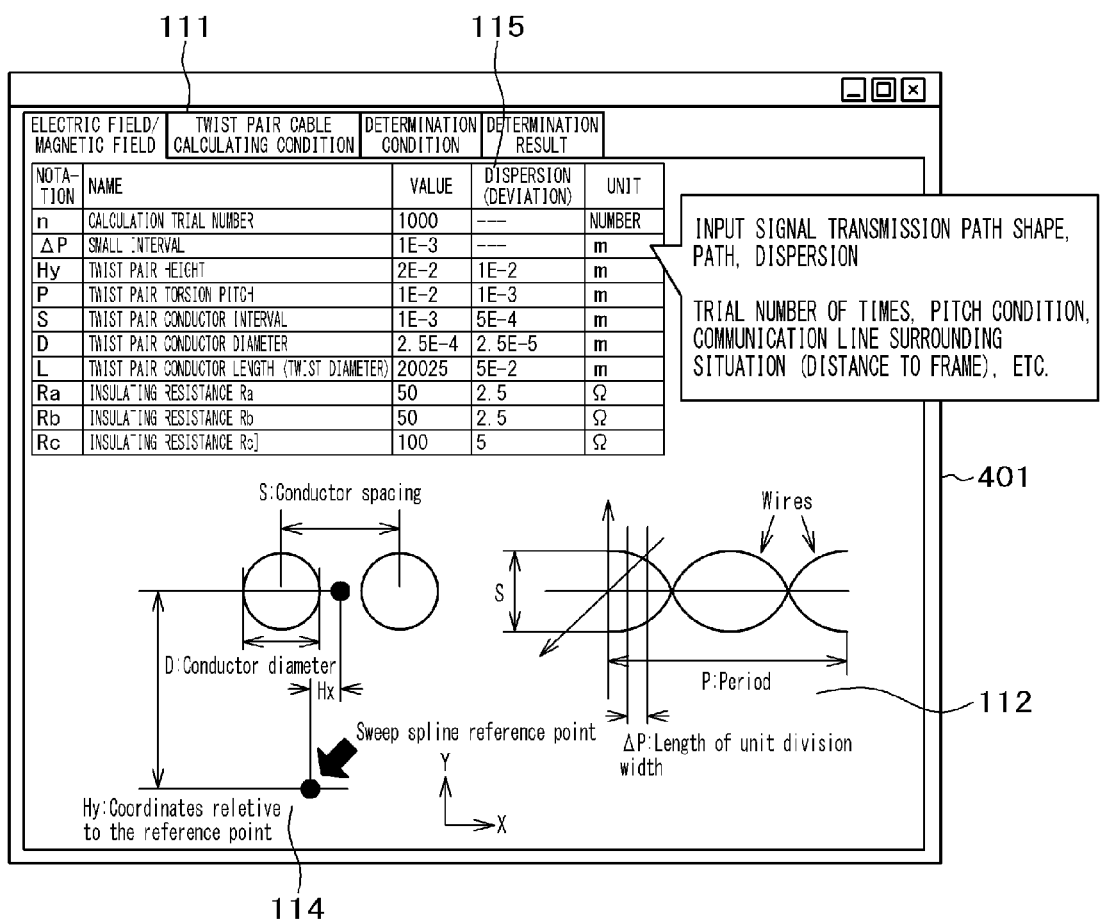
FIG. 4 shows an input screen showing an example of a signal transmission path shape, a path, a dispersion information input screen, and an explanatory view of a noise voltage calculating method according to first embodiment of the present invention.
Figure 5:
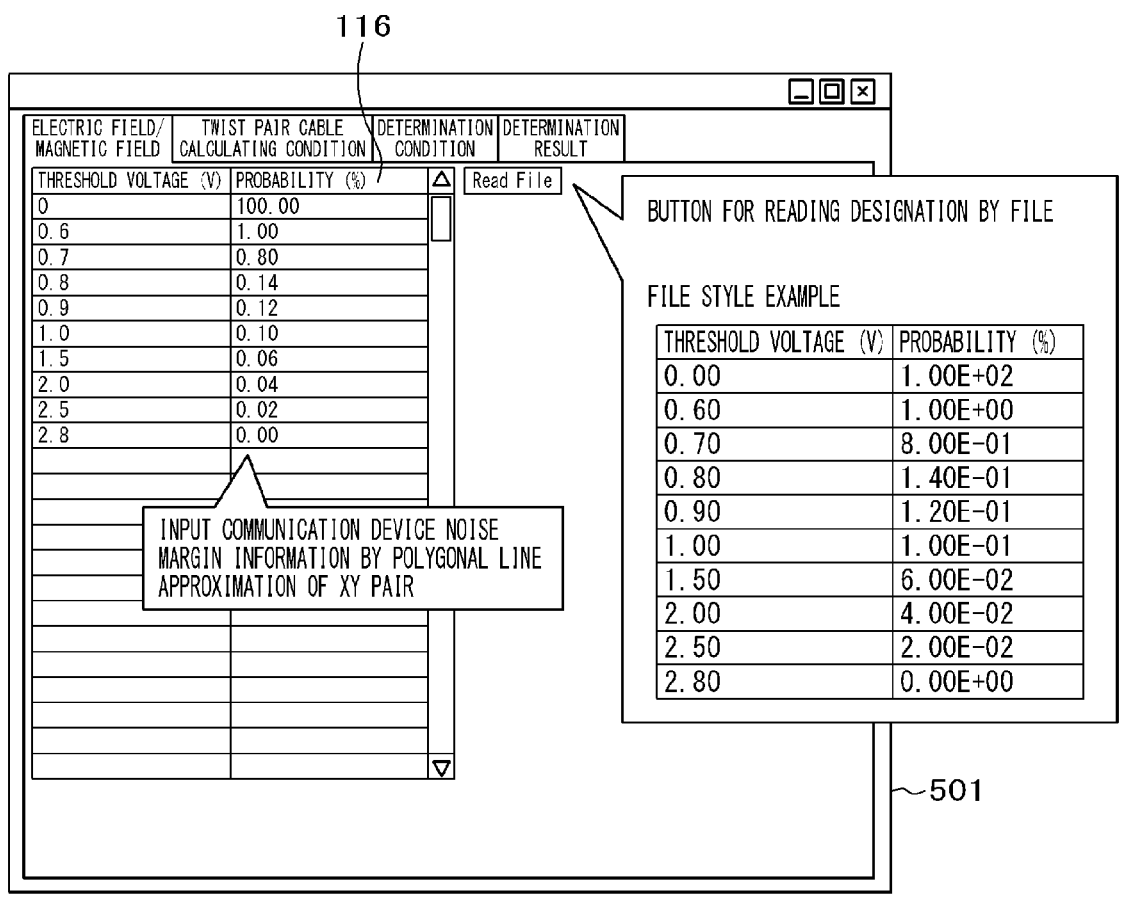
FIG. 5 shows an input screen showing an example of an electronic circuit device noise margin information input screen according to first embodiment of the present invention.

At the calculation condition inputting step S300, a user is to input information of the shape, the path, the dispersion, the communication noise margin information of the signal transmission path and the like by using interfaces (GUI: Graphic User Interface) 401 and 501 as shown in FIG. 4 and FIG. 5 as the inputting unit 100. That is, in the interface screen 401 of FIG. 4 shows an example of displaying the kind inputting unit 111, and the shape inputting unit 112, the path inputting unit 113, the object information inputting unit 114, the shape dispersion inputting unit 115 of lines as the inputting unit 110, and the interface screen 501 of FIG. 5 shows an example of displaying the noise margin information inputting unit 116.

FIG. 4 shows an example of a case where a twist pair cable is used as the signal transmission path, and it is necessary to change a display content in accordance with a kind of the signal transmission path.

FIG. 5 shows an example of a case where APD (Amplitude Probability Distribution) described in "APD Measurement for Evaluating Disturbances Related to the Performance of Digital Communication Systems", Kaoru Gotoh; Yasushi Matsumoto; Yukio Yamanaka; Takashi Shinozuka; IEICE Transactions on Communications Vol. E88-B No. 8 pp. 3235-3241 is used as the communication device noise margin information, and it is necessary to change an error determining method or communication device noise margin information used in accordance with a kind of a communication content or the like.

As necessary input information, there are a kind of a signal transmission path inputted from the signal transmission line kind inputted unit 111, shape information inputted from the shape inputting unit 112 and capable of specifying a standard shape of the signal transmission line, a standard path of the signal transmission path inputted from the path inputting unit 113, information inputted from the shape dispersion inputting unit 115 and capable of specifying dispersion from a standard shape/path at an arbitrary location of the signal transmission path, communication path noise margin information inputted from the noise margin information inputting unit 116, and other information inputted from the other parameter inputting unit 117.

The signal transmission path vicinity electric field/magnetic field calculating step S301 calculates the electric field/magnetic field at the signal transmission path vicinity from the object information other than the signal transmission path, and the signal transmission path shape, the path, the dispersion and the like inputted at the step S300. A calculating method is not particularly limited but a general electric field/magnetic field simulation method can be utilized.

The calculation finish determining step S302 determines the calculation finish from a trial number of times and conversion of the error rate. A calculating method is particularly limited but a general finish determining method can be utilized.

Although the calculation of the noise waveform at the noise waveform calculating step S303 can be calculated by a general electric field/magnetic field simulation method, according to the present embodiment, an explanation will be given of an example of using a higher speed noise waveform calculating method.

Figure 6:
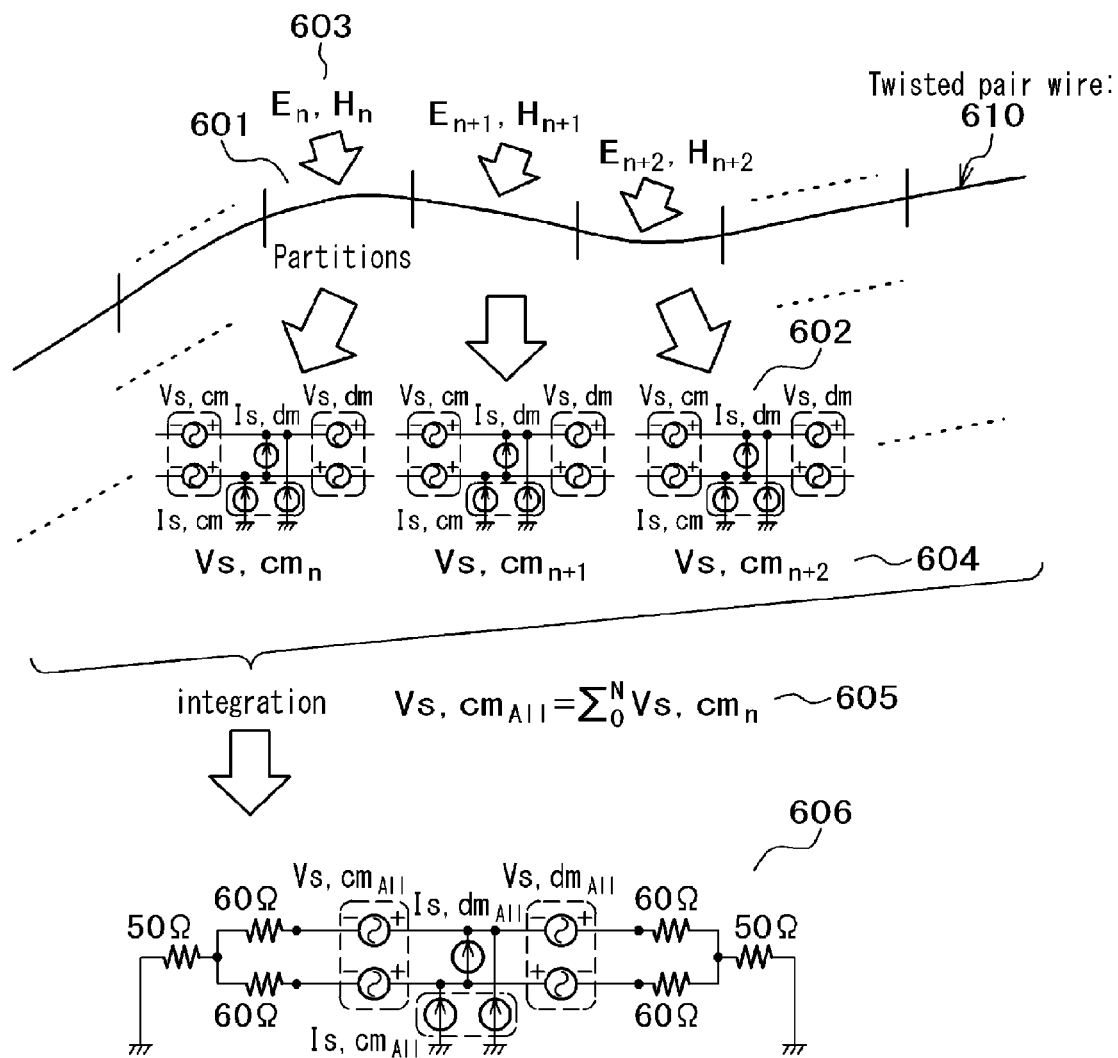
FIG. 6 shows a diagram for explaining a procedure of calculating noise generated at a signal transmission path according to first embodiment of the present invention.

As shown in "Plane-Wave Coupling to a Twisted-Wire Pair above Ground", S. A. Pignari; G. Spadacini, IEEE Transactions on Electromagnetic Compatibility, Year: 2011, Volume: 53, Issue: 2, Pages: 508-523, an excited voltage brought about at a signal transmission line in an electric field/magnetic field can be represented by an equivalent circuit by limiting the electric field/magnetic field and the signal transmission line shape. According to the present embodiment, the signal transmission line is limited to a twist pair cable. In this case, as described in Plane-Wave Coupling to a Twisted-Wire Pair above Ground, S. A. Pignari; G. Spadacini, IEEE Transactions on Electromagnetic Compatibility, Year: 2011, Volume: 53, Issue: 2, Pages: 508-523, a signal transmission line 610 shown in FIG. 6 is divided to plural small sections 601 of a size to a degree of capable of being approximated by an equivalent circuit, and a corresponding equivalent circuit 602 is formed for each divided small section 601.

A circuit constant 603: Vs and cm of the equivalent circuit 602 of the small section 601 can be calculated from the signal transmission path shape of the small section 601 and electric field and/or magnetic field 603 at the vicinity of the small section calculated at step S301. After calculating the electric fields and the magnetic fields of all the small sections, by integrating 604 of these, a total of the signal transmission lines can be calculated as a noise waveform brought about at an equivalent circuit 605.

Although the error occurrence determining step S304 can utilize various kinds of methods without being limited to the methods, an explanation will be given of an example of a determining method using APD. In a graph 700 of FIG. 7, as data bundled by a curve 701, an APD graph is measured at the utmost limit amplitude at which an error is started to be brought about at respective waveforms when noise of various waveforms (sin wave, square wave, triangular wave, etc.) is given in communication in a communication device.

A numeral 702 indicated by a dotted line shows an error determining standard, and is a line segment formed by connecting together portions predicted to bring about a direct cause of respective errors of data bundled by a line segment 701. That is, in a case where there is a portion of the APD graph on a right side (also including in contact with) of the error determining standard line 702, it seems that noise of the corresponding graph brings about an error.

Figure 7:
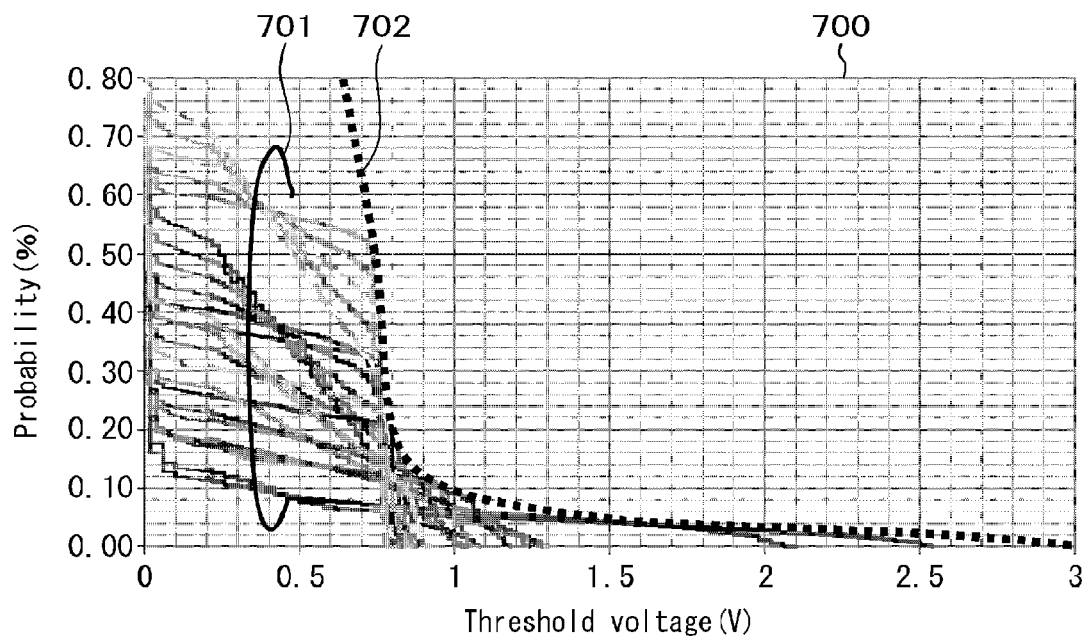
FIG. 7 is a graph describing an APD calculated by measuring an utmost possible amplitude at which an error is started to be caused in each noise waveform when noise is applied on a signal transmission path and an error determining line calculated therefrom according to first embodiment of the present invention.
Figure 8:
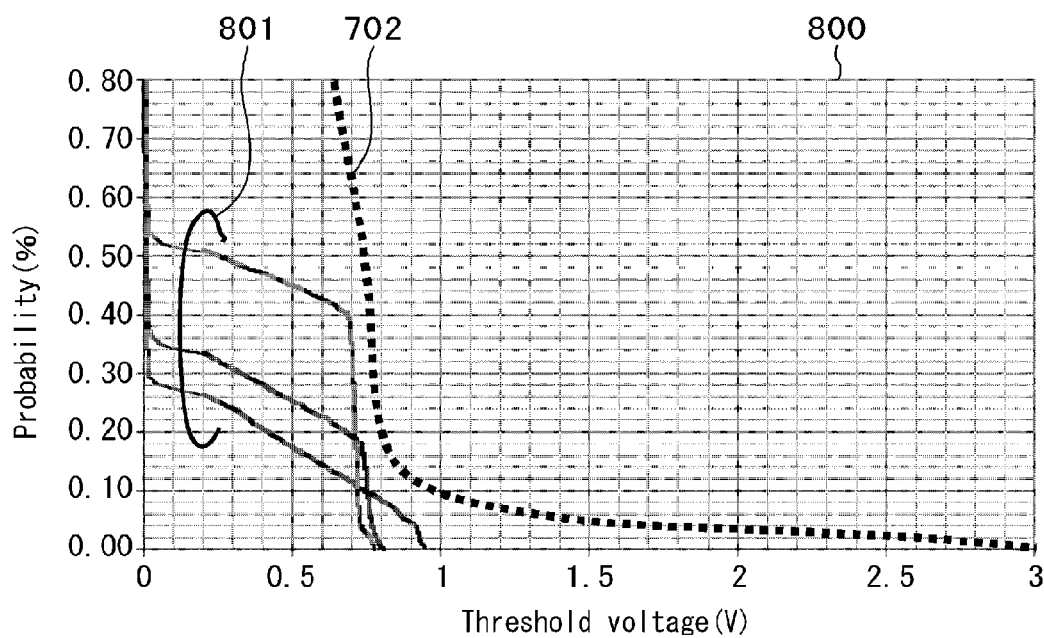
FIG. 8 is a graph describing an APD graph and an error determining line of noise of the utmost possible amplitude at which an error is not caused when noise is applied on a signal transmission path according to first embodiment of the present invention.

Data bundled by a curve 801 shown in a graph 800 of FIG. 8 is an APD graph of the utmost amplitude of noise which does not bring about an error in the same communication device as the one used for measurement in FIG. 7. An error can be predicted not to be brought about when the entire APD graph is present on a left side of the error determining standard line 702. In this way, when the line segment of error determining standard line 702 is determined by measuring the line segment, in an arbitrary noise waveform, it can be determined whether an error is brought about.

The error rate calculating step S305 and the result display step S306 are not particularly limited but a general method can be utilized. For example, in the error rate calculating step S305, a rate of the error occurrence number of times of the total trial number of times may be determined as the error rate.

Next, as a specific example of the processing flow explained in reference to FIG. 3, an equivalent circuit 602 is formed by dividing the signal transmission line 610 shown in FIG. 6 to the plural small sections 601, and a description will be given of a processing flow of determining an error occurrence by calculating a noise waveform of a total of the signal transmission line in reference to FIG. 9A. Further, a configuration of the error rate calculating unit 133 is shown in FIG. 9B.

Figure 3:
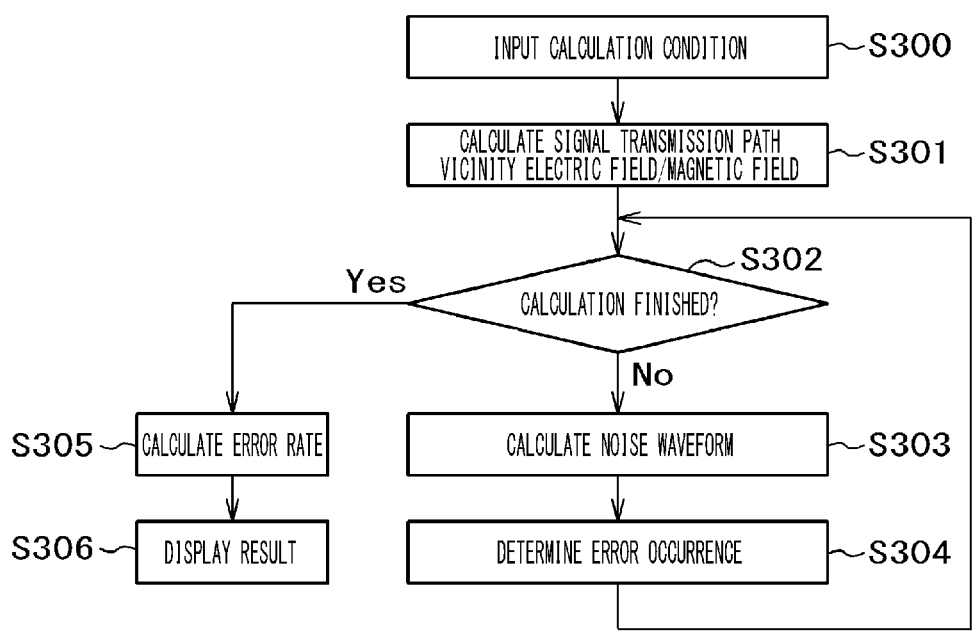
FIG. 3 is a flowchart showing a flowchart showing a flow of processing of the signal line noise resistance evaluating method according to the first embodiment of the present invention.
Figure 9A:
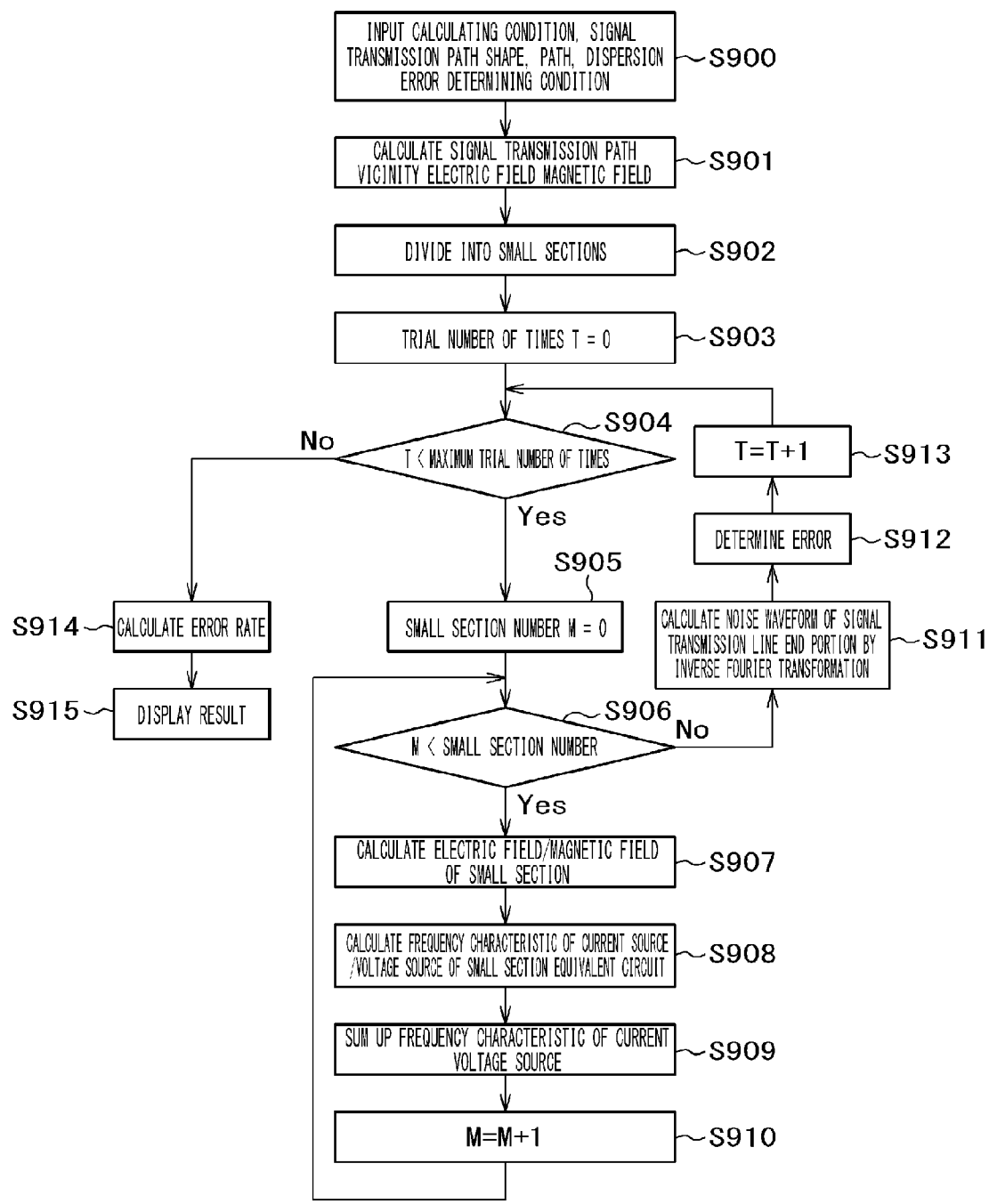
FIG. 9A is a flowchart showing a flow of detailed processing of a signal line noise resistance evaluating method according to first embodiment of the present invention.
Figure 9B:
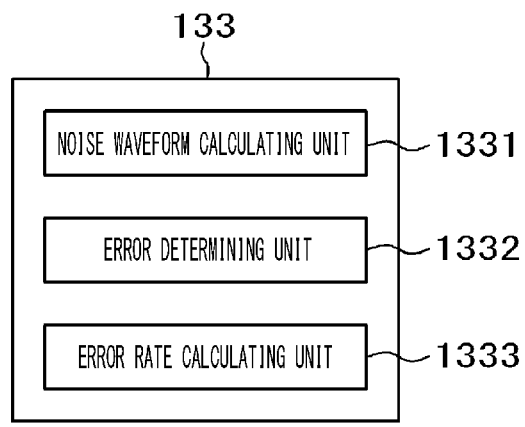
FIG. 9B is a block diagram showing a detailed configuration of an error rate calculating unit of a signal line noise resistance evaluating device according to first embodiment of the present invention.

Although the flowchart shown in FIG. 9A is basically the same as the flow explained in reference to FIG. 3, the determination of finishing the calculation at S302 of the flow of FIG. 3 is determined by a number of times of trials of the error determination in the flow shown in FIG. 9A.

First, at S900, the calculating condition and the error determining condition are inputted. Similarly to the case of S300, the calculating conditions are information of the shape, the path, the dispersion, the communication noise margin information of the signal transmission path and the like, and they are inputted from the signal transmission line kind inputting unit 111, the shape inputting unit 112, the path inputting unit 113, the shape dispersion inputting unit 115, the noise margin information inputting unit 116 of the signal inputting unit 110.

Next, at a signal transmission path vicinity electric/magnetic field calculating step S901, an electric field and/or a magnetic field at a signal transmission path vicinity is calculated by using shape information of a signal transmission line stored to the signal transmission line shape information storing unit 122 of the storing unit 120, and path information of a signal transmission line stored to the signal transmission line path information storing unit 123 at a signal transmission path vicinity electric field/magnetic field calculating step S901.

Next, as shown in FIG. 6, the signal transmission line 610 is divided into plural small sections of a size of a degree of capable of approximating by an equivalent circuit (S902), and a trial number of times T of calculation is set to 0 (S903).

Next, it is determined whether the trial number of times T of calculation is smaller than a previously set maximum trial number of times (S904), in a case where the trial number of times T of calculation is smaller than a previously set maximum trial number of times (Yes), 0 is set as a number M to the small section divided at S902 (S905).

Next, it is checked whether the number M of the small sections is smaller than a number of sections 601 divided at S902 (S906), and in a case where the number M of the small sections is smaller than the number of the sections 601 divided at S902 (Yes), the electric field/magnetic field of the small section M are calculated by using information of the electric field/magnetic field of the signal transmission line calculated at S901.

Next, as explained in FIG. 6, an equivalent circuit 602 of the small section M is calculated, a circuit constant 604 of the equivalent circuit is calculated by using a signal transmission path shape of the small section M and information 603 of the electric field/magnetic field of the small section M calculated at S907, and a frequency characteristic of the current source/voltage source of the small section M is calculated (S908).

Next, the calculated frequency characteristics of the current sources/voltage sources of the calculated small sections M are summed up (S909), and the number M of the small section is replaced by M+1 (S910). Next, going back to S906, it is checked whether the small section number M is smaller than a number of the divided sections 601 divided at S902, and in a case where the number of the small section M is smaller than the number of the divided sections 601 (Yes), S907 through S910 are executed.

On the other hand, in a case where the number M of the small section is not smaller than the number of the sections 601 divided at S902 (No), the frequency characteristics of the current sources/voltage sources over an entire area of the small sections divided at S902 are calculated and these are summed up, and a result calculated by summing up these is brought into inverse Fourier transformation, and a noise waveform of an end portion of the signal transmission line in correspondence with the entire domain is calculated (S911).

The processing from S900 to S911 is executed at a noise waveform calculating unit 1331 of the error rate calculating unit 133 shown in FIG. 9B.

Next, an error is determined by comparing the noise waveform calculated by calculating the noise waveform calculating unit 1331 with an error determining standard inputted at S900 (S912). Specifically, as explained in reference to FIG. 7 and FIG. 8, it is checked whether there is a portion are overlapping the error determining standard line 702 or a portion intersecting therewith is present by plotting the noise waveform on a graph, and if there is a portion overlapping with the error determining standard line 702 or a portion intersecting therewith, it is determined that an error is generated.

The processing of determining an error of S912 is executed at the error determining unit of FIG. 9B.

Next, trial number of times T is replaced by T+1 (S913), it is checked whether new T is smaller than the previously set maximum trial number of times by returning to S904, in a smaller case (Yes), S905 through S813 are repeated.

On the other hand, in a case where T is not smaller than the previously set maximum trial number of times (No), the error rate is calculated (S914). Specifically, a rate of a number of times of determining to generate an error at S912 relative to a maximum trial number of times is calculated as an error rate.

The calculation of the error rate is executed at the error rate calculating unit 1333 of FIG. 9B.

Finally, information of the calculated error rate and shape information of the signal transmission path when it is determined that the error is generated is displayed at the result display unit 140 (S915).

Figure 10:
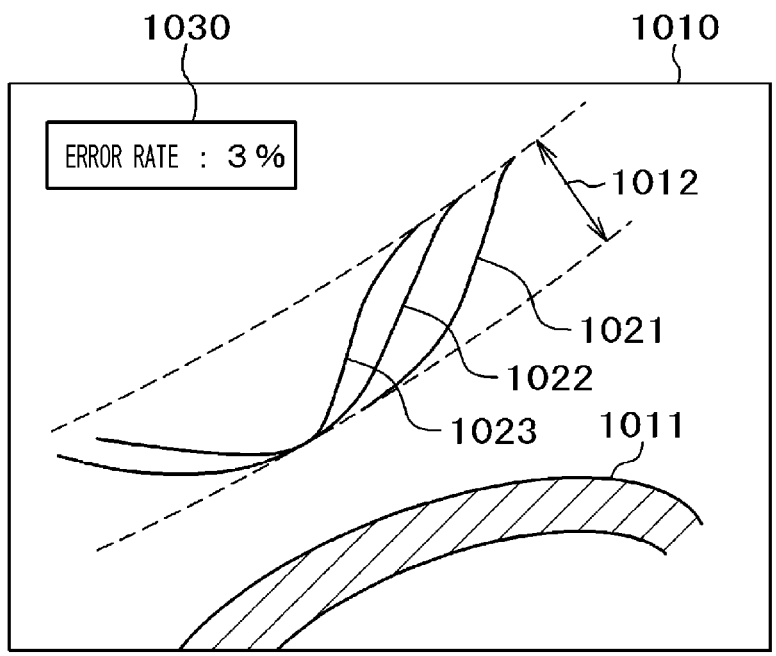
FIG. 10 is a view showing a screen of an outputting unit of a signal line noise resistance evaluating device according to first embodiment of the present invention.

FIG. 10 shows an example of a screen 1010 displaying a result of the result display unit 140. A circuit 1011 (for example, battery wiring) generating a magnetic field and an existing range 1012 of a signal transmission path of evaluating generation of an error are displayed on a screen 1010, and shapes 1021, 1022, 1023 . . . of the signal transmission path when it is determined that an error is generated inside the existing range 1012 of the signal transmission path are displayed.

It becomes easy to take measures against noise by visually displaying an evaluation result of an error by noise in this way.

Second Embodiment

Figure 11:
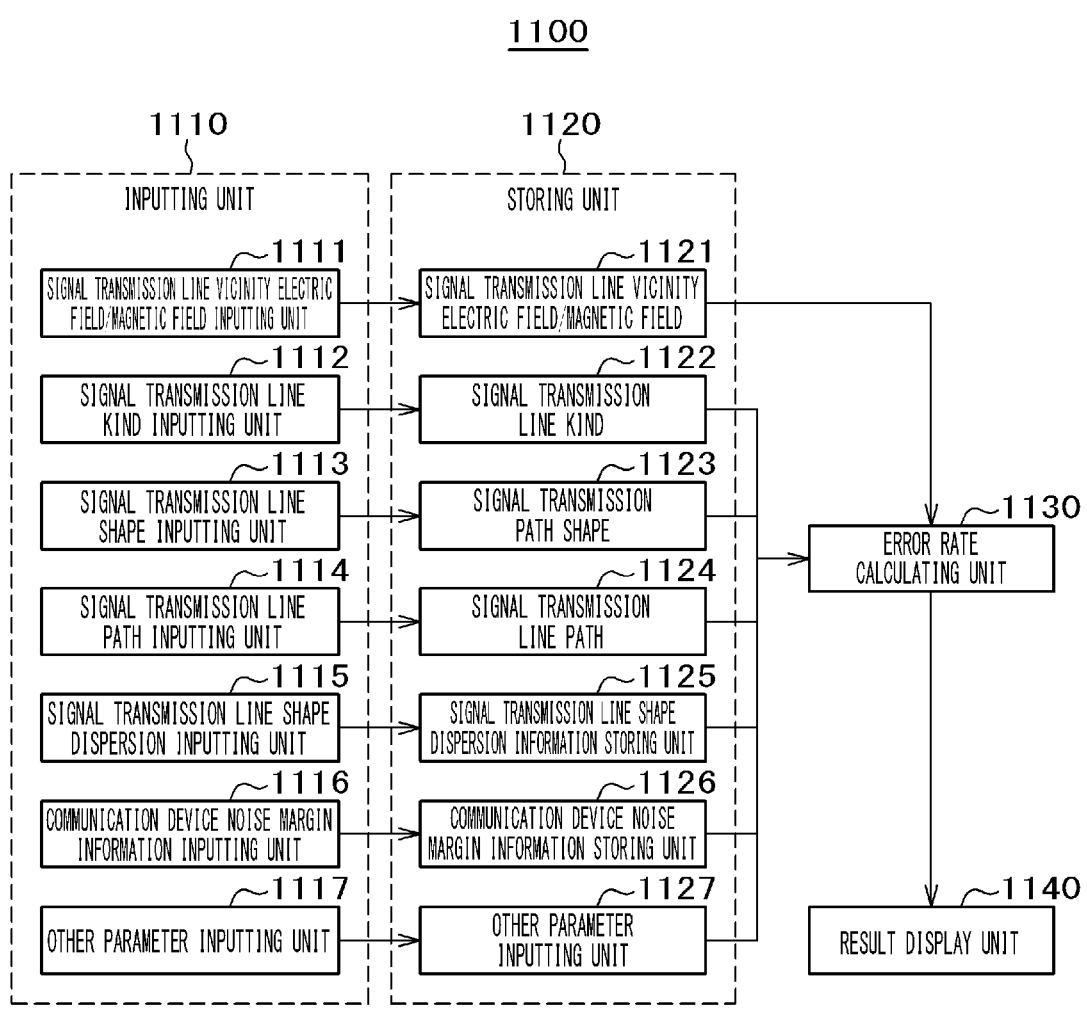
FIG. 11 is a block diagram showing an outline configuration of a signal line noise resistance evaluating device according to second embodiment of the present invention.

FIG. 11 shows a block diagram displaying an outline configuration of a signal line noise resistance evaluating device 1100 according to second embodiment.

The signal line noise resistance evaluating device 1100 according to the present embodiment is configured by including an inputting unit 1110, and a storing unit 1120, an error rate calculating unit 1130, and a result display unit 1140 similar to the case of the first embodiment.

The inputting unit 1110 includes a signal transmission line vicinity electric field/magnetic field inputting unit 1111 for inputting an electric field and a magnetic field at a vicinity of a signal transmission line, a signal transmission line kind inputting unit 1112 for inputting a kind of a signal transmission line, a shape inputting unit 1113 for inputting a shape of the signal transmission line, a path inputting unit 1114 for inputting a path of the signal transmission line, a shape dispersion inputting unit 1115 for inputting shape dispersion of the signal transmission line, noise margin information inputting unit 1116 for inputting noise margin information of a communication device connected to the signal transmission line, and an other parameter inputting unit 1117 for inputting other parameters.

The storing unit 1120 includes a signal transmission line vicinity electric field/magnetic field information storing unit 1121 for storing information of an electric field and a magnetic field at a vicinity of the signal transmission line inputted from the signal transmission line vicinity electric field/magnetic field inputting unit 1111, a signal line kind storing unit 1122 for storing information of a kind of the signal transmission line inputted from the signal transmission line kind inputting unit 1112, a signal transmission line shape storing unit 1123 for storing shape information of the signal transmission line inputted from the shape of the shape inputting unit 1113, a signal transmission line path information storing unit 1124 for storing path information of the signal transmission line inputted from the path inputting unit 1114, a signal transmission line shape dispersion information storing unit 1125 for storing shape dispersion information of the signal transmission line inputted from the shape dispersion inputting unit 1115, a communication device noise margin information storing unit 1126 for storing noise margin information of a communication device connected to the signal transmission line inputted from the communication device noise margin information inputting unit 1116, and a parameter storing unit 1127 for storing other parameters inputted from the other parameter inputting unit 1117.

The error rate calculating unit 1130 calculates an error rate from signal transmission line vicinity electric field/magnetic field information, signal transmission kind information, signal transmission path shape information, signal transmission line path information, signal transmission path dispersion information, information of a noise margin of a communicating device, and information of other parameters inputted from the inputting unit 1110 and stored to the storing unit 1120.

The result display unit 1140 displays an error rate calculated by calculating by the error rate calculating unit 1130.

The difference from the signal line noise resistance evaluating device 100 explained in first embodiment resides in that the calculation of the signal transmission path vicinity electric field/magnetic field is carried out by an external simulation device, a result thereof is inputted from the signal transmission line vicinity electric field/magnetic field inputting unit 1111 of the inputting unit 1110 and stored to the signal transmission line vicinity electric field/magnetic field information storing unit 1121 of the inputting unit 1120, and the error rate is calculated at the error rate calculating unit 1130.

As described above, according to the configuration shown in the present embodiment, the error rate in consideration of the signal line dispersion can be calculated. Further, the present invention is not limited to the embodiments described above but includes various modified examples. For example, the embodiments described above have been explained in details to make it easy to understand the present invention and are not necessarily limited to what includes all of the configurations. Further, a portion of a configuration of a certain embodiment can be replaced by a configuration of another embodiment, and a configuration of another embodiment can be added to a configuration of a certain embodiment. Further, concerning a portion of a configuration of each embodiment, other configurations can be added, or deleted, or replaced.

What is claimed is:

1. A computer system for evaluating noise resistance of a signal transmission line for connecting electronic control devices, comprising:
    a processor; and
    a memory storing instructions that, when executed by the processor, cause the computer system to:
        receive input information concerning a shape of the signal transmission line, information concerning a path of the signal transmission line, object information other than the signal transmission line, information concerning shape dispersion of the signal transmission line, and noise margin information of the electronic control device connected to the signal transmission line;
        calculate an electric field and a magnetic field at a vicinity of the transmission line using the information concerning the input signal transmission path shape, the information concerning the signal transmission line path, and the information of the object other than the signal transmission line;
        calculate a waveform of noise generated at the signal transmission line using information of the calculated electric field and the calculated magnetic field at the vicinity of the signal transmission line, the information concerning the input signal transmission line shape, the information concerning the signal transmission line path and the information concerning the shape dispersion of the signal transmission line; and calculate an error rate of the electronic control device using waveform information of the noise generated at the calculated signal transmission line and the input noise margin information of the electronic control device.

2. The computer system of claim 1, wherein in calculating the error rate, an error of the electronic control device is determined by using the waveform information of the noise generated at the signal transmission line calculated and the inputted noise margin information of the electronic control device, and calculation of the waveform of the noise generated at the signal transmission line and determination of the error of the electronic control device are repeatedly executed while changing the signal transmission path shape to thereby calculate the error rate of the electronic control device.

3. The computer system of claim 1, wherein the waveform of the noise generated at the signal transmission line determined by the calculation is a noise waveform at an end portion of the signal transmission line.

4. The computer system of claim 2, further comprising:
outputting the information of the calculated error rate of the electronic control device and the path information of the signal transmission line generating the noise determined to be the error.

5. The computer system of claim 1, wherein in calculating the waveform of the noise generated at the signal transmission line, the signal transmission line is divided into small sections, electric fields and magnetic fields for respective small sections divided are calculated by using information of the electric field and the magnetic field at a vicinity of the calculated signal transmission line, frequency characteristics of equivalent circuits of the respective small sections are calculated by using the information of the electric fields and the magnetic fields for the calculated respective small sections, and the waveform of the noise generated at the signal transmission line is calculated based on a result of summing up the frequency characteristics of the equivalent circuits of the calculated respective small sections.

6. A computer system for evaluating noise resistance of a signal transmission line connecting electronic control devices, comprising:
a processor; and
a memory storing instructions that, when executed by the processor, cause the computer system to:
receive information concerning a shape of the signal transmission line, information concerning a path of the signal transmission line, object information other than the signal transmission line, information concerning shape dispersion of the signal transmission line, and information including noise margin information of an electronic control device connected to the signal transmission line;
store information concerning the shape of the signal transmission line, the information concerning the path of the signal transmission line, the object information other than the signal transmission line, the information concerning shape dispersion of the signal transmission line, and the noise margin information of the electronic control device connected to the signal transmission line;
calculate an electric field and a magnetic field at a vicinity of the signal transmission line by using the information concerning the shape of the signal transmission line, the information concerning the path of the signal transmission line, the object information other than the signal line transmission line;

calculate a waveform of noise generated at the signal transmission line by using information of the electric field and the magnetic field at the vicinity of the signal transmission line; and calculate an error rate of the electronic control device using waveform information of the noise generated at the signal transmission line and the received noise margin information.

7. The computer system of claim 6 further comprising determining an error of the electronic control device by using the information of the waveform of the noise generated at the signal transmission line and the noise margin information of the electronic control device, and calculating the error rate of the electronic control device using a result of repeatedly executing calculation of noise generated at the signal transmission line and determination of the error of the electronic control device while changing the signal transmission path shape.

8. The computer system of claim 6, wherein the waveform of noise generated at the signal transmission line is a noise waveform of the electronic control device at an end portion of the signal transmission line.

9. The computer system of claim 7 further comprising, displaying information of the error rate of the electronic control device and the path information of the signal transmission line that has generated the noise.

10. The computer system of claim 6 further comprising, calculating the noise waveform generated at the signal transmission line by dividing the signal transmission line into small sections, calculating electric fields and magnetic fields for respective small sections divided by using the information of the calculated electric fields and the calculated magnetic fields at the vicinity of the calculated signal transmission line, and calculating a frequency characteristic of an equivalent circuit of the respective small section by using the information of the electric field and the magnetic field of the small section respectively calculated, and the waveform of the noise generated at the signal transmission line is calculated by summing up a result of the frequency characteristics of the respective small sections of the calculated small sections.

11. A method for evaluating noise resistance of a signal transmission line connecting electronic control devices, comprising:
receiving information concerning a shape of the signal transmission line, information concerning a path of the signal transmission line, object information other than the signal transmission line, information concerning shape dispersion of the signal transmission line, and information including noise margin information of an electronic control device connected to the signal transmission line;
storing information concerning the shape of the signal transmission line, the information concerning the path of the signal transmission line, the object information other than the signal transmission line, the information concerning shape dispersion of the signal transmission line, and the noise margin information of the electronic control device connected to the signal transmission line;
calculating an electric field and a magnetic field at a vicinity of the signal transmission line by using the information concerning a shape of the signal transmission line, the information concerning the path of the signal transmission line, the object information other than the signal line transmission line;

calculating a waveform of noise generated at the signal transmission line by using information of the electric field and the magnetic field at the vicinity of the signal transmission line; and calculating an error rate of the electronic control device using waveform information of the noise generated at the signal transmission line and the received noise margin information.

12. The method of claim 11, further comprising:

determining an error of the electronic control device by using the information of the waveform of the noise generated at the signal transmission line and the noise margin information of the electronic control device, and calculating the error rate of the electronic control device using a result of repeatedly executing calculation of noise generated at the signal transmission line and determination of the error of the electronic control device while changing the signal transmission path shape.

13. The method of claim 11, wherein the waveform of noise generated at the signal transmission line is a noise waveform of the electronic control device at an end portion of the signal transmission line.

14. The method of claim 12, further comprising:

displaying information of the error rate of the electronic control device and the path information of the signal transmission line that has generated the noise determined.

15. The method of claim 11 further comprising:

calculating the noise waveform generated at the signal transmission line by dividing the signal transmission line into small sections, calculating electric fields and magnetic fields for respective small sections divided by using the information of the calculated electric fields and the calculated magnetic fields at the vicinity of the signal transmission line, and calculated frequency characteristic of an equivalent circuit of the respective small section by using the information of the electric field and the magnetic field of the small section respectively calculated, and the waveform of the noise generated at the signal transmission line is calculated by summing up a result of the frequency characteristics of the respective small sections of the calculated small sections.

* * * * *